United States Patent [19]

Martin

[11] 4,376,149
[45] Mar. 8, 1983

[54] SILICONE POLYMER COMPOSITIONS
[75] Inventor: Eugene R. Martin, Onsted, Mich.
[73] Assignee: SWS Silicones Corporation, Adrian, Mich.
[21] Appl. No.: 282,324
[22] Filed: Jul. 10, 1981

Related U.S. Application Data
[63] Continuation-in-part of Ser. No. 170,298, Jul. 18, 1980, abandoned.
[51] Int. Cl.$^3$ ................................................ B32B 7/00
[52] U.S. Cl. ........................................ 428/266; 528/33; 528/34; 427/387; 427/389.9; 428/447
[58] Field of Search ............................ 528/33, 34, 26; 427/387, 389.9; 428/266, 447

[56] References Cited
U.S. PATENT DOCUMENTS 3,770,489 11/1973 Richardson .................... 428/447
3,876,459  4/1975 Burril ............................. 428/375
4,299,879 11/1981 Martin ............................ 428/266

Primary Examiner—Melvyn I. Marquis

[57] ABSTRACT

Silicone polymer compositions are prepared by mixing silylated polyethers with silanol terminated organopolysiloxanes in the presence or absence of solvents and/or emulsifiers. These silicone polymer compositions may be applied as a solution or as a dispersion to textile substrates to impart a soft silky coating thereon.

24 Claims, No Drawings

SILICONE POLYMER COMPOSITIONS

This application is a continuation-in-part of application Serial No. 06/170,298, filed on July 18, 1980, now abandoned.

The present invention relates to silicone polymers, particularly to a composition obtained from silylated polyethers and silanol terminated polysiloxanes and more particularly to a process for coating textile materials with the silicone polymers.

BACKGROUND OF INVENTION

Heretofore textile materials have been treated with compositions containing a hydroxyl terminated organopolysiloxane, a crosslinking agent and a catalyst to impart a soft, silky, durable hand thereto. (See U.S. Pat. Nos. 3,876,459 to Burrill and 3,770,489 to Richardson). Although treatment with these organopolysiloxanes has been very effective for the intended purpose, it requires that each of the constituents be emulsified and then stored separately. Furthermore, once the emulsions of each of the constituents have been mixed, the resultant mixture has a limited pot life. Likewise, siloxane emulsions have a tendency to separate when they are being applied to textiles, thereby resulting in a non-uniform coating. When these coated textile materials are then subjected to further treatment, such as dyeing or printing, the uneven distribution of organopolysiloxane on the surface of the textile materials interferes with the print dye quality of the material.

Therefore, one of the advantages of this invention is that silicone polymers can be dispersed in water to form stable emulsions or solutions. Separate emulsions consisting of a crosslinker and a catalyst are not required to effect curing of the compositions of this invention. Morever, the compositions of this invention provide a finish for textile substrates that do not have a limited stability.

Therefore, it is an object of this invention to provide a composition containing silicone polymers. Another object of this invention is to provide a composition containing silicone polymers which may be applied to textile materials to impart a soft, silky hand thereto. Still another object of this invention is to provide a composition containing silylated polyethers and silanol terminated organopolysiloxanes. A further object of this invention is to provide a composition which is obtained from the reaction of silylated polyethers and silanol terminated organopolysiloxanes. A still further object of this invention is to provide a stable emulsion which does not require additives for effecting treatment of textile materials.

SUMMARY OF INVENTION

The foregoing objects and others which will become apparent from the following description are accomplished in accordance with this invention, generally speaking, by providing a composition containing silylated polyethers and silanol terminated organopolysiloxanes. The resultant composition may be combined with water to form dispersions which may be used to treat textile substrates to impart a soft, silky and durable hand thereto.

DETAILED DESCRIPTION OF INVENTION

The silylated polyethers which are mixed with the silanol terminated organopolysiloxanes may be represented by the formula:

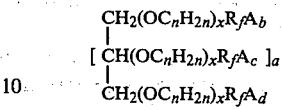

wherein at least one R is selected from the group consisting of an —NH radical, an ammonium radical or a radical of the formula

in which the radicals represented by R are linked to the polyether through an ester, amine, amide or ammonium radical and the remaining R groups are selected from hydrocarbonoxy radicals having up to 18 carbon atoms, hydroxyl radicals or a radical of the formula

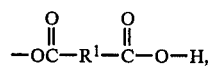

$R^1$ which may be the same or different represents a divalent hydrocarbon radical selected from the group consisting of $(CH_2)_y$, $CH=CH$, and a cyclic divalent hydrocarbon radical selected from the group consisting of $C_6H_4$, $C_6H_8$, $C_6H_{10}$ and $C_{10}H_6$; A which may be the same or different is a silicon containing radical selected from the group consisting of cationic or anionic radicals of the formula

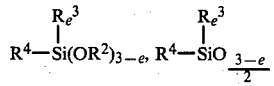

and nonionic radicals of the formula

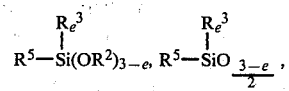

$R^2$ and $R^3$ which may be the same or different, are monovalent hydrocarbon radicals having from 1 to 18 carbon atoms, $R^4$ is an ionic radical linked to a silicon atom consisting of hydrogen, carbon, oxygen and nitrogen atoms selected from the formulas

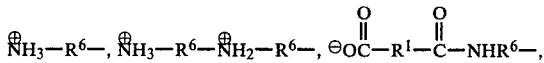

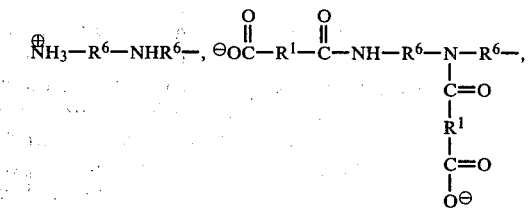

-continued

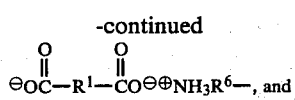

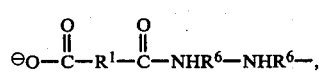

R⁵ is a nonionic divalent radical represented by R⁶ or radicals consisting of carbon, hydrogen, oxygen and nitrogen atoms selected from the formulas

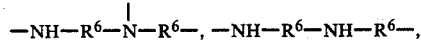

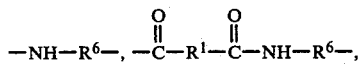

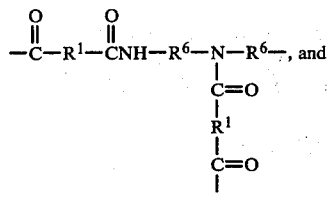

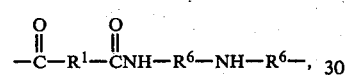

with the proviso that when R is the radical

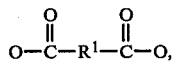

then R⁵ is R⁶, wherein R⁶ which may be the same or different is a radical selected from the group consisting of a saturated divalent hydrocarbon radical having up to 10 carbons, a divalent hydrocarbonoxy radical having up to 50 carbon atoms in which the oxygen is in the form of an ether linkage and an unsaturated divalent hydrocarbon radical having up to 10 carbon atoms in which the unsatisfied valences of the R⁶ radical are linked to a silicon atom. The unsatisfied valences or charges of A are satisfied by R and when A is a divalent radical and contains a dication or dianion, the ratio of A to R is 1:2 and when R is a cation, then A must be an anion, and when R is an anion, then A must be a cation and when R is a nonionic radical, then A must be a nonionic radical, a is a number of from 0 to 4; b, c and d are each 0 or 1, the sum of b, c and d must be at least 1, and when b, c or d are 0, then R must be a hydroxyl or hydrocarbonoxy radical or a radical of the formula

e is a number of from 0 to 2, f which may be the same or different is 0 or 1, and when f is 0, then R⁵ is a divalent hydrocarbonoxy radical linked to the silicon atom through a carbon-carbon bond, n is 2, 3 or 4, x is a number of at least 1 and up to 600, preferably from 10 to 250 and y is a number of from 0 to 10. These silylated polyethers may be applied to textile materials to form a hydrophilic coating thereon.

Suitable examples of silicon containing radicals represented by A above are:

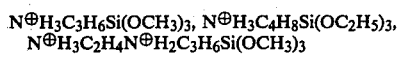

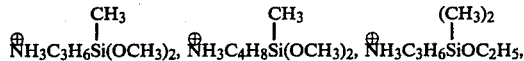

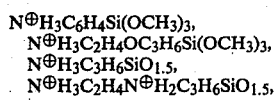

$N^{\oplus}H_3C_6H_4Si(OCH_3)_3$,
$N^{\oplus}H_3C_2H_4OC_3H_6Si(OCH_3)_3$,
$N^{\oplus}H_3C_3H_6SiO_{1.5}$,
$N^{\oplus}H_3C_2H_4N^{\oplus}H_2C_3H_6SiO_{1.5}$,

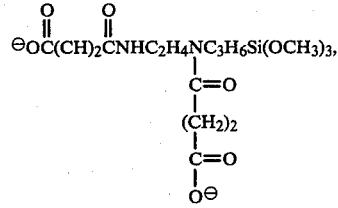

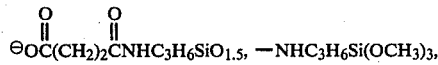

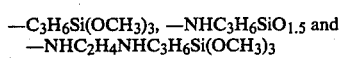

$-C_3H_6Si(OCH_3)_3$, $-NHC_3H_6SiO_{1.5}$ and
$-NHC_2H_4NHC_3H_6Si(OCH_3)_3$

The unsatisfied valences of the silicon atoms in the above formulas are satisfied by silicon-oxygen-silicon linkages.

Suitable examples of hydrocarbonoxy radicals represented by R having from 1 to 18 carbon atoms are methoxy, ethoxy, propoxy, butoxy, octoxy, dodecoxy and octadecoxy radicals. Examples of preferred radicals represented by R¹ are divalent hydrocarbon radicals having from 1 to 10 carbon atoms such as methylene, ethylene, trimethylene, tetramethylene, pentamethylene, hexamethylene, octamethylene and decamethylene radicals. Examples of divalent cyclic radicals represented by R¹ are phenylene, naphthenylene, cyclohexylene and cyclohexenylene radicals.

Suitable examples of monovalent hydrocarbon radicals represented by R² and R³ are alkyl radicals, e.g., methyl, ethyl, propyl, butyl, hexyl, octyl, decyl, dodecyl and octadecyl radicals; aryl radicals, e.g., the phenyl radical; alkaryl radicals, e.g., tolyl, xylyl and ethylphenyl radicals; cycloalkyl radicals, e.g., cyclobutyl, cyclohexyl, cyclodecyl radicals and aralkyl radicals, e.g., benzyl, 2-phenylethyl, and 2-phenylpropyl radicals.

Examples of suitable divalent hydrocarbon radicals represented by R⁵ are radicals having up to 50 carbon atoms of the formula

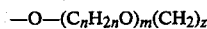

where m is from 0 to 24, n is 2, 3 or 4 and z is a number of from 1 to 10.

Examples of suitable divalent radicals represented by R⁶ are hydrocarbon radicals such as ethylene, trimethylene, hexamethylene and octamethylene radicals and hydrocarbonoxy containing radicals of the formula $(C_2H_4O)_r(CH_2)_z$, $(C_3H_6O)_r(CH_2)_z$ and $(C_4H_8O)_r(CH_2)_z$ where r is from 1 to 24, and z is the same as above. Specific examples of hydrocarbonoxy containing radicals are ethylene oxide, trimethylene oxide and tetramethylene oxide and alkenylene radicals such as vinylene, propenylene, butenylene, hexenylene and the like.

The silylated polyethers of this invention may be prepared by several different techniques. Some of the techniques for preparing these silylated polyethers are described in copending application Ser. No. 074,188 filed Sept. 10, 1979.

One method for preparing the silylated polyethers is to react oxyalkylene glycols or copolymers thereof with a cyclic anhydride at a temperature of from 80° to 185° C. to form a half ester which is then reacted with an aminofunctional silane having at least 1 and up to 3 alkoxy groups per silicon atom at from 0° to 110° C.

Another method for preparing the silylated polyethers is to react an aminofunctional silane with a cyclic anhydride at a temperature of from 25° to 100° C. to form a carboxylic acid functional silane, and thereafter reacting the resultant silane with an amine terminated oxyalkylene polymer or copolymers thereof at a temperature of from 0° to 100° C.

In the methods described above, if the reactants are heated up to about 115° C., the resultant product is an ammonium salt. When an amido linkage is desired, then the reactants are heated at temperatures above 115° C.

Still another method for preparing the silylated polyethers is to react an amine terminated oxyalkylene polymer or copolymers thereof with a cyclic anhydride to form a carboxylic acid functional polymer which is then reacted with an aminofunctional silane at a temperature of from 0° to 100° C.

The silylated polyethers employed in this invention may be prepared by reacting an oxyalkylene glycol or copolymers thereof with a cyclic anhydride and thereafter reacting the resultant carboxylic acid polymer with a haloalkylalkoxysilane in the presence of an acid acceptor, e.g., triethylamine at a temperature of from 80° to 150° C.

The silylated polyethers may also be prepared by reacting an amine terminated oxyalkylene polymer or copolymers thereof with a haloalkylalkoxysilane and thereafter reacting the resultant product with sodium alkoxide at a temperature of from about 80° to 150° C.

The silylated polyethers used in the compositions of this invention may also be prepared by substituting dicarboxylic acids having up to 10 carbon atoms for the anhydrides described above.

When dicarboxylic acids are used, it may be advantageous to employ esterification catalysts such as titanates, alkali metal hydroxides or mineral acids.

Suitable examples of dicarboxylic acids which may be used are oxalic acid, malonic acid, succinic acid, glutaric acid, adipic acid, pimelic acid, suberic acid, azelaic and sebacic acid.

The oxyalkylene glycols and copolymers thereof which are used to make the compositions of this invention are well known in the art. These glycols and copolymers thereof may be illustrated by the following formula $$\begin{array}{l} CH_2-(OC_nH_{2n})_xOG \\ | \\ [CH-(OC_nH_{2n})_xOG]_a \\ | \\ CH_2-(OC_nH_{2n})_xOG, \end{array}$$

where G is hydrogen or an alkyl radical having from 1 to 18 carbon atoms, in which at least one G must be hydrogen and n is 2, 3 or 4, x is a number of at least 1 and up to 600, preferably from 10 to 250. Generally, these glycols are made by the homopolymerization or copolymerization of ethylene oxide, propylene oxide and/or butylene oxide using various alcohols as initiators. Examples of suitable alcohols are monohydric alcohols such as methanol, ethanol, t-butanol as well as dihydric and polyhydric alcohols such as glycols, e.g., ethylene glycol, glycerol and the like.

Suitable examples of anhydrides that may be used to make the compositions of this invention are succinic anhydride, glutaconic anhydride, maleic anhydride, 1,2-cyclohexanedicarboxylic anhydride, 1-cyclohexene-1,2-dicarboxylic anhydride, 3-cyclohexene-1, 2-dicarboxylic anhydride, 4-cyclohexene-1, 2-dicarboxylic anhydride, 1,8-naphthalic acid anhydride and phthalic anhydride.

Suitable examples of aminofunctional silanes which may be used to prepare the compositions of this invention are beta-aminopropyltriethoxysilane, gamma-aminopropyltrimethoxysilane, methyl-beta-(aminoethyl)-gamma-aminopropyldimethoxysilane, omega-aminohexyltributoxysilane, beta-(aminoethoxy)propyltrimethoxysilane, beta-(aminoethoxy)hexyltriethoxysilane, beta-(aminopropoxy)butyltributoxysilane,

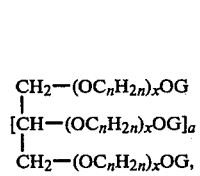

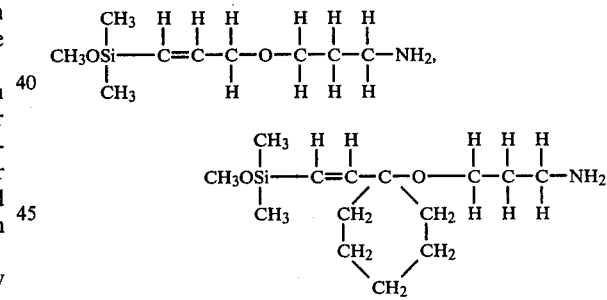

and the like.

Examples of amine terminated oxyalkylene homopolymers and copolymers which may be used to prepare the compositions of this invention are those having the general formula $$\begin{array}{l} CH_2(OC_nH_{2n})_xNH_2 \\ | \\ [CH(OC_nH_{2n})_xNH_2]_a \\ | \\ CH_2(OC_nH_{2n})_xNH_2 \end{array}$$

wherein a, n and x are the same as above. These polymers can be synthesized by effecting the amination of the corresponding oxyalkylene homopolymer or copolymer having terminal haloalkyl groups. These haloalkyl terminated polymers may be prepared by reacting oxyalkylene glycol or copolymers thereof with a phosphorus trihalide.

The haloalkyl silanes that may be used in the preparation of the silylated polyethers may be represented by the formula

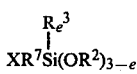

wherein $R^2$, $R^3$ and e are the same as above, $R^7$ is a divalent hydrocarbon radical having from 1 to 18 carbon atoms, and X is a halogen such as chlorine, bromine and iodine.

Suitable examples of divalent hydrocarbon radicals represented by $R^7$ are ethylene, trimethylene, tetramethylene, hexamethylene, octamethylene, dodecamethylene, hexadecamethylene and octadecamethylene radicals.

More specifically, suitable examples of haloalkylsilanes that may be used are chloropropyltrimethoxysilane, chloropropylmethyldimethoxysilane, chloropropyldimethylethoxysilane, bromopropyltriethoxysilane, iodobutylmethyldimethoxysilane, bromobutylethyldimethoxysilane and the like.

In the above reactions, the mole ratio of anhydride to amine or hydroxl groups linked to the polyether or silane may be varied over a wide range. For example, the mole ratio of anhydride to amine or hydroxyl group may range from 0.17:1 to 1.25:1 with the preferred ratio of anhydride to amine or hydroxyl groups being from 0.33:1 to 1.1:1, with the proviso that at least one amine or hydroxyl group per molecule is reacted with the anhydride.

In the subsequent silylation of the polyethers, the mole ratio of the carboxylic acid radical formed from the reaction of the cyclic anhydride with the above amine or hydroxyl groups, to the haloalkyl radicals linked to the silane or the amine groups linked to the silane or polyether may range from 0.17:1 to 1.25:1 with the proviso that at least one carboxylic acid radical per molecule is present for each amine group in order that an ammonium salt or the corresponding amide or ester is formed.

Branched or linear silanol terminated organopolysiloxanes having structural units of the formula:

are mixed with the silylated polyethers to form the silicone polymer compositions of this invention, in which $R^3$ is a monovalent hydrocarbon radical having from 1 to 18 carbon atoms and e is 2, 3 or 4. All unsatisfied valences of the silicon atoms are satisfied through Si-O-Si linkages or hydroxyl groups. Preferably the organopolysiloxanes have a viscosity of from 15 to 1,000,000 cs. at 25° C. and more preferably from 25 to 500,000 cs. at 25° C. Emulsions of the silanol terminated organopolysiloxanes may also be used.

Suitable examples of monovalent hydrocarbon radicals are alkyl radicals such as methyl, ethyl, propyl, butyl, hexyl, decyl, dodecyl and octadecyl radicals; cycloalkyl radicals such as cyclobutyl, cyclohexyl, cyclodecyl radicals; aryl radicals such as the phenyl radical; aralkyl radicals such as benzyl, 2-phenylethyl, and the 2-phenylpropyl radical and alkaryl radicals such as tolyl, xylyl and ethylphenyl radicals.

The compositions of this invention may be prepared by mixing the silylated polyether with the silanol terminated organopolysiloxane in the absence or presence of certain diluents, such as solvents and emulsifiers, preferably at an elevated temperature, e.g., up to about 90° C. and above. Examples of suitable diluents are water, hydrocarbon solvents such as heptane or di-n-butylether, aromatic hydrocarbons, or chlorinated hydrocarbons. Examples of suitable emulsifiers include non-ionic emulsifiers such as nonylphenol ethylene oxide adducts, polyoxyethylene stearates, etc.; anionic emulsifiers such as sodium lauryl sulfate, sodium stearate, etc.; cationic emulsifiers such as quaternary ammonium chlorides, etc., or amphoteric emulsifiers such as amino acids, etc.

The preferred method for preparing the compositions containing silicone polymers is to mix the silylated polyether and the silanol terminated polysiloxane in the absence of a diluent at a temperature of from 25° to 70° C. The resultant composition can then be mixed with diluents in an amount of from 0.25 to 99.75 parts of the silicone containing polymers with from 99.75 to 0.25 part of diluent and more specifically, from 0.5 to 50 parts of the silicone containing polymers with from 99.5 to 50 parts of diluent. Dispersions can be made by vigorously mixing water as a diluent with the silicone containing polymers for about 1 hour at room temperature.

The silicone containing compositions of this invention include mixtures of silylated polyethers and silanol terminated polysiloxanes, as well as the reaction products of silylated polyethers and silanol terminated polysiloxanes. These compositions may be prepared by employing an excess of either the silylated polyether or the silanol terminated polysiloxane. The amount of silylated polyether present in the compositions of this invention may range from about 0.25 to 99.75 percent by weight and the amount of silanol terminated organopolysiloxane may range from about 99.75 to 0.25 percent by weight based on the weight of silylated polyether and silanol terminated organopolysiloxane. Preferably, the weight ratio of silylated polyether to silanol terminated organopolysiloxane may range from 1 to 99 percent to 99 to 1 percent by weight and more preferably from 95 to 50 percent by weight of silylated polyether to 5 to 50 percent by weight of silanol terminated organopolysiloxane based on the combined weight of the silylated polyether and silanol terminated organopolysiloxane.

The compositions of this invention containing silylated polyethers and silanol terminated organopolysiloxanes can be applied to textile materials in admixture with other substances which have been used heretofore to impart certain properties to textile materials. Other substances which may be used in combination with the compositions of this invention are lubricating agents, agents which improve abrasion resistance of the treated fibers, materials which improve the fragrance of the treated materials, antistatic lubricants, fabric softeners, fire retardants, soil resistant materials and crease-proofing agents. Examples of suitable crease-proofing agents are aminoplast resins such as urea-formaldehyde resins, melamine-formaldehyde resins, and dimethylol dihydroxy ethylene urea which may contain magnesium chloride and zinc nitrate as catalysts. In certain applications the amount of crease-proofing agent may be reduced when using the compositions of this invention without sacrificing crease-proofing properties. Other crease-proofing resins are phenol-formaldehyde resins and hydroxyethyl methacrylate resins.

The compositions of this invention may be applied in concentrated form or they may be dispersed in water or in organic solvents such as di-n-butylether, aliphatic hydrocarbons, aromatic hydrocarbons, and/or chlorinated hydrocarbons and then applied to the textile materials.

The water dispersions of the compositions of this invention may be further stabilized by the addition of certain emulsifiers. Examples of such stabilizing agents include nonionic emulsifiers such as nonylphenol ethylene oxide adducts, polyoxyethylene stearates, etc.; anionic emulsifiers such as sodium lauryl sulfate, sodium stearate, etc.; cationic emulsifiers such as quaternary ammonium chlorides, etc., or amphoteric emulsifiers such as amino acids, etc.

The compositions of this invention, and if desired additional substances, may be applied to all textile materials, including natural and synthetic fibers on which organopolysiloxanes have been or could have been applied heretofore. Examples of such textile materials are wool, cotton, rayon, hemp, natural silk, polypropylene, polyethylene, polyester, polyurethane, polyamide, cellulose acetate, polyacrylonitrile fibers, and mixtures of such fibers. The textile materials may consist of staple or monofilament fibers.

The compositions of this invention and additional substances, if desired, may be applied to the textile materials by any means known in the art, such as by spraying, immersion, foaming, padding, calendering or by gliding the fibers across a base which has been saturated with the compositions of this invention.

Generally, the solids add-on is preferably in the range of from 0.025 to 20 percent and more preferably from about 0.04 to 10 percent, based on the weight of the original textile material.

After the textile material has been treated, it is dried at an elevated temperature, e.g., from about 50° to 200° C. for a brief period of time, e.g., from about 3 to 15 minutes.

The treated textile material should contain from about 0.25 to about 10 percent by weight on a dry basis of the cured composition of this invention.

Textile materials treated with the compositions of this invention possess beneficial properties such as a soft, durable hand and either hydrophobic or hydrophilic characteristics depending on the type of silicone polymer employed.

Specific embodiments of this invention are further illustrated in the following examples in which all parts are by weight unless otherwise specified.

EXAMPLE 1

(a) A carboxylic acid functional polyether is prepared by reacting about 2,000 parts (0.35 mole) of an oxyethylene-oxypropylene triol copolymer having a mole ratio of oxyethylene units to oxypropylene units of about 2.5 to 1 and a molecular weight of about 5,660 with about 106.1 parts (1.06 moles) of succinic anhydride at a temperature of about 175° C. for eighteen hours. The resultant product has a viscosity of 4,168 cs. at 25° C. Nuclear Magnetic Resonance (NMR) Analysis shows a mole ratio of functional groups as follows:

| Functional Group | Mole Ratio |
|---|---|
| $C_3H_6O$ | 1.0 |
| $C_2H_4O$ | 2.45 |

The acid content is found to be about 0.58 milliequivalent of acid per gram while the theoretical value is 0.5 milliequivalent per gram. The product is represented by the formula

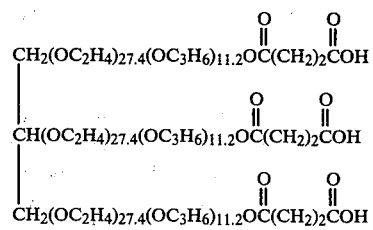

(b) About 900 parts of the above product are reacted with about 90.1 parts of aminopropyltriethoxysilane for about 1 hour. A slight exotherm is observed. The resultant silylated polyether, which is a dark straw colored liquid has a viscosity of about 24,460 cs. at 25° C. The silylated polyether may be represented by the formula

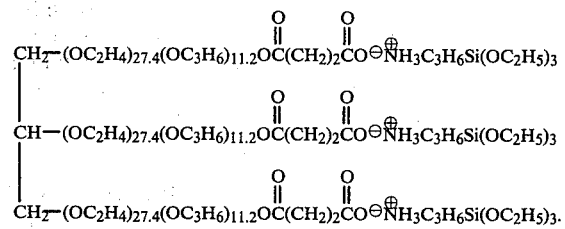

(c) About 270 parts of the silylated polyether prepared in (b) above, are mixed with 30 parts of a linear silanol terminated dimethylpolysiloxane having a silanol content of about 2.5 percent and a viscosity of about 70 cs. at 25° C. at a temperature of 70° C. for 3 hours. The resultant product is an opaque, yellow liquid, with a viscosity of about 77,340 cs. at 25° C.

EXAMPLE 2

One hundred parts of the composition prepared in Example 1(c) are dispersed in 200 parts of water by mixing at room temperature for one hour. The dispersion is an opaque, yellow, homogeneous liquid with a viscosity of 57.5 cs. at 25° C. A rubber-like film is formed upon evaporation of the water.

EXAMPLE 3

About 200 parts of the silylated polyether prepared in Example 1(b) above are mixed with 100 parts of a silanol terminated dimethylpolysiloxane, having a silanol content of about 2.5 percent and a viscosity of about 70 cs. at 25° C., at a temperature of 25° C. for 3 hours. The resultant composition is an opaque, yellow liquid having a viscosity of about 57,500 cs. at 25° C.

About 100 parts of this composition are mixed with 200 parts of water at room temperature for 1 hour. The dispersion is an opaque, white liquid having a viscosity of 25 cs. at 25° C. A rubber-like film is formed when the water is removed by evaporation.

EXAMPLE 4

About 285 parts of the silylated polyether prepared in Example 1(b) above are mixed at 70° C. with 15 parts of a silanol terminated dimethylpolysiloxane having a silanol content of about 2.5 percent and a viscosity of about 70 cs. at 25° C. for 3 hours. The resultant composition is an opaque, yellow liquid with a viscosity of 79,000 cs. at 25° C.

About 100 parts of this composition are mixed with 200 parts of water at room temperature for 1 hour. The dispersion is an opaque, yellow liquid having a viscosity of 44.8 cs. at 25° C. A rubber-like film is formed upon evaporation of the water.

EXAMPLE 5

About 135 parts of the silylated polyether prepared in Example 1(b) above are mixed at 70° C. with 15 parts of a silanol terminated dimethylpolysiloxane having a viscosity of 20,000 cs. at 25° C. for 3 hours. The composition thus formed is an opaque, white, viscous liquid which by NMR Analysis contains the following groups in the indicated mole ratios:

| | |
|---|---|
| $OC_2H_4$ | 2.45 |
| $OC_3H_6$ | 1.0 |
| $Si(CH_3)_2$ | 0.24 |

About 100 parts of this composition are dispersed in 200 parts of water by mixing at room temperature for 1 hour. The dispersion is an opaque, yellow liquid with a viscosity of about 40 cs. at 25° C. A rubber-like film is formed upon evaporation of the water.

EXAMPLE 6

About 37.5 parts of the silylated polyether prepared in Example 1(b) above are mixed at 25° C. with 112.5 parts of a silanol terminated dimethylpolysiloxane having a viscosity of 20,000 cs. at 25° C. for 3 hours. The resultant composition is an opaque, white, high viscosity liquid which by NMR Analysis contains the following groups in the indicated ratios:

| | |
|---|---|
| $OC_2H_4$ | 2.39 |
| $OC_3H_6$ | 1.0 |
| $Si(CH_3)_2$ | 7.85 |

About 100 parts of this composition are dispersed in 200 parts of water by mixing at room temperature for 1 hour. The dispersion is an opaque, yellow liquid with a viscosity of about 50 cs. at 25° C. A sponge-like material is formed upon evaporation of the water.

EXAMPLE 7

About 15 parts of the silylated polyether prepared in Example 1(b) above are mixed at 25° C. with 135 parts of a silanol terminated dimethylpolysiloxane having a viscosity of 20,000 cs. at 25° C. for 3 hours. The resulting composition is an opaque, white, viscous liquid which by NMR Analysis contains the following groups in the indicated ratios:

| | |
|---|---|
| $OC_2H_4$ | 1.91 |
| $OC_3H_6$ | 1.0 |
| $Si(CH_3)_2$ | 22.3 |

EXAMPLE 8

About 135 parts of the silylated polyether prepared in Example 1(b) above are mixed at 25° C. with 15 parts of a silanol terminated dimethylpolysiloxane having a viscosity of 24 cs. at 25° C. and a hydroxyl content of 5.7 percent for 3 hours. The resultant composition is an opaque, yellow liquid with a viscosity of 8,800 cs. at 25° C.

About 100 parts of this composition are dispersed in 200 parts of water by mixing at room temperature for 1 hour. The dispersion is an opaque, white liquid with a viscosity of 23 cs. at 25° C. A rubber-like foam is formed upon evaporation of the water.

EXAMPLE 9

About 540 parts of the silylated polyether prepared in Example 1(b) above are mixed at 25° C. with 60 parts of a silanol terminated dimethylpolysiloxane having a viscosity of about 30 cs. at 25° C. and a hydroxyl content of about 3.5 percent for 3 hours. The resulting copolymer is an opaque, yellow liquid with a viscosity of 13,700 cs. at 25° C. NMR Analysis of the resultant composition indicated the presence of the following groups in the indicated ratios:

| | |
|---|---|
| $C_2H_4O$ | 2.9 |
| $C_3H_6O$ | 1.0 |
| $Si(CH_3)_2$ | 0.32 |

About 100 parts of this composition are dispersed in 200 parts of water by mixing at room temperature for 1 hour. The dispersion is an opaque, white liquid having a viscosity of about 30 cs. at 25° C.

Upon evaporation, a product is obtained which is similar to the product of Example 8.

EXAMPLE 10

About 135 parts of the silylated polyether prepared in Example 1(b) above are mixed with 15 parts of a silanol terminated dimethylpolysiloxane, having an OH content of about 3.8 percent and a viscosity of about 30 cs. at 25° C., at a temperature of 70° C. for 3 hours. The resultant composition is an opaque, white, viscous liquid which by NMR Analysis contains the following groups in the indicated ratios:

| | |
|---|---|
| $C_2H_4O$ | 2.47 |
| $C_3H_6O$ | 1.0 |
| $Si(CH_3)_2$ | 0.25 |

About 100 parts of this composition are mixed with 200 parts of water for 1 hour at room temperature. The dispersion is an opaque, white liquid having a viscosity of 37 cs. at 25° C. A product is obtained which is similar to the product obtained from Example 2.

EXAMPLE 11

About 135 parts of the silylated polyether prepared in Example 1(b) above are mixed with 15 parts of a silanol terminated dimethylpolysiloxane having a hydroxyl content of about 2.9 percent and a viscosity of about 30 cs. at 25° C., at a temperature of 25° C. for 3 hours. The resultant composition is an opaque, yellow liquid with a viscosity of 16,400 cs. at 25° C. which by NMR Analysis contains the following groups in the indicated ratios:

| | |
|---|---|
| $C_2H_4O$ | 2.59 |
| $C_3H_6O$ | 1.0 |
| $Si(CH_3)_2$ | 0.17 |

About 100 parts of this composition are mixed with 200 parts of water for 1 hour at room temperature. The resultant dispersion is an opaque, white liquid having a viscosity of 48 cs. at 25° C. A rubber-like film is obtained when the water is removed by evaporation.

EXAMPLE 12

About 135 parts of the silylated polyether prepared in Example 1(b) above are mixed with 15 parts of a silanol terminated dimethylpolysiloxane having a viscosity of 500,000 cs. at 25° C. for 3 hours. The resultant composition is an opaque, yellow, high viscosity fluid which by NMR Analysis contains the following groups in the indicated ratios:

| | |
|---|---|
| $C_2H_4O$ | 2.46 |
| $C_3H_6O$ | 1.0 |
| $Si(CH_3)_2$ | 0.19 |

About 100 parts of this composition are mixed with 200 parts of water for 1 hour at room temperature. The resultant composition is an opaque, white liquid having a viscosity of 30 cs. at 25° C. A rubber-like foam is obtained when the water is removed by evaporation.

EXAMPLE 13

(a) A carboxylic acid functional polyether is prepared by reacting about 1200 parts of the oxyethylene-oxypropylene triol described in Example 1(a) with about 88.8 parts of phthalic anhydride at a temperature of about 120° C. for eighteen hours. The acid content of the resultant product is about 0.5 milliequivalent of acid per gram.

(b) About 1288.8 parts of the above product are reacted with about 132.6 parts of 3-aminopropyltriethoxysilane. The resultant silylated polyether is a dark-colored liquid with a viscosity of 8.250 cs. at 25° C.

(c) About 450 parts of the silylated polyether prepared in (b) above, are mixed with 50 parts of the linear silanol terminated dimethylpolysiloxane described in Example 1(c) above, at 25° C. for 3 hours. The resultant composition is an opaque, yellow liquid having a viscosity of 3,580 cs. at 25° C.

EXAMPLE 14

The procedure of Example 13 is repeated, except that the carboxylic acid functional polyether is prepared by substituting 58.8 parts of maleic anhydride containing 0.2 parts paramethoxyphenol for the phthalic anhydride. The resultant composition is reacted with 3-aminopropyltriethoxysilane to form a silylated polyether. The silylated polyether is mixed with the silanol terminated dimethylpolysiloxane to form a composition having a viscosity of 137,600 cs. at 25° C.

EXAMPLE 15

(a) A carboxylic acid functional polyether is prepared by refluxing a mixture containing 95 parts of oxyethylene diol having a molecular weight of about 400, 50 parts of xylene and 56.1 parts of succinic acid, until 8.5 parts of water is collected in a Dean Stark Head. The xylene is then removed in vacuum up to a temperature of about 100° C.

(b) When about 105.5 parts of 3-aminopropyltriethoxysilane are added to the product obtained in (a) above at 40° C., the temperature increased to about 80° C. An opaque, yellow silylated polyether is obtained.

(c) About 180 parts of the silylated polyether prepared in (b) above are then mixed with 20 parts of the silanol terminated polysiloxane described in Example 1(c) for 3 hours at about 25° C. An opaque, yellow composition having a viscosity of 34,500 cs. at 25° C. is obtained.

EXAMPLE 16

(a) A silylated polyether is prepared by reacting 1540 parts of oxyethylene diol having a molecular weight of about 1500 with about 108 parts of sodium methoxide and thereafter, the resultant product is vacuum stripped for four hours at an elevated temperature to remove methanol as a by-product. The resultant product is cooled to room temperature, then about 397 parts of chloropropyltrimethoxysilane are added and then heated to about 100° C. for 4 hours. The resultant product is then filtered to remove the sodium chloride by-product. The resultant silylated polyether is an opaque, brown wax.

(b) About 180 parts of the silylated polyether prepared in (a) above are mixed with 20 parts of the silanol terminated polysiloxane described in Example 1(c) for one hour at room temperature. An opaque, white wax, which melts at 34° to 38° C. is obtained.

EXAMPLE 17

A water solution of the silylated polyether prepared in Example 1(b) above is prepared by mixing 100 parts of the silylated polyether with 200 parts water for 1 hour at room temperature.

About 85 parts of this solution are mixed with 15 parts of an aqueous emulsion containing 35 percent by weight of a silanol terminated dimethylpolysiloxane having a viscosity of about 70 cs. at 25° C. for 3 hours at a temperature of 70° C. The resulting dispersion is an opaque, yellow liquid having a viscosity of 54 cs. at 25° C.

EXAMPLE 18

The stability of the water dispersions containing 33 percent by weight of the compositions prepared in the above Examples is determined by (1) heating the various dispersions in a forced air oven at 50° C. and monitoring the stability with time and (2) performing consecutive freeze-thaw cycles on the dispersions by cooling to −40° C. until frozen and then allowing the dispersions to thaw at room temperature and monitoring the stability after each cycle.

The following table summarizes the results of these tests.

TABLE I

| Example Number | Time at 50° C. | Number of Freeze/ Thaw Cycles |
|---|---|---|
| 2 | Greater than 2 months | Greater than 5 |
| 3 | Greater than 2 months | Greater than 3 |
| 4 | Greater than 2 months | Greater than 3 |

COMPARISON EXAMPLE $V_1$

About 270 parts of the silylated polyether prepared in Example 1(b) above are mixed with 30 parts of a trimethylsiloxy endblocked dimethylpolysiloxane having a viscosity of 50 cs. at 25° C. for 3 hours. When agitation ceases, the mixture immediately separates into 2 phases. About 100 parts of this heterogeneous mixture are dispersed in 200 parts of water by mixing at room temperature for 1 hour. The dispersion is unstable and immediately separates into 2 phases. Upon evaporation of the water, a heterogeneous product is obtained consisting of a friable rubber-like material and an oily liquid.

COMPARISON EXAMPLE V₂

About 135 parts of the carboxylic acid intermediate, prepared in accordance with Example 1(a) and 15 parts of a silanol terminated dimethylpolysiloxane having an OH content of about 2.5 percent and a viscosity of 70 cs. at 25° C. are mixed at a temperature of 25° C. for 3 hours. An opaque, yellow liquid, which did not readily phase separate is obtained. About 200 parts of deionized water are added to the mixture and agitated for 1 hour at room temperature. The aqueous dispersion separated into two phases after 3 days.

EXAMPLE 19

A textile fabric containing a mixture of Dacron polyester and cotton (65/35) is treated with the compositions prepared in the above Examples by dipping the fabric in aqueous dispersions containing 2 percent by weight of the various compositions prepared in the respective Examples in which the percent by weight is based on total weight of the solution. The fabric is then dried for two minutes at 340° F. in a force air oven. The hand characteristics of each fabric is then rated from 1 to 5, where 5 designates a soft, silky, lubricuous hand and 1 designates a stiff, harsh, boardy hand. The following table summarizes the observations:

TABLE II

| Example Number | Hand Rating |
|---|---|
| 1(c) | 5 |
| 3 | 4 |
| 4 | 4 |
| 5 | 3 |
| 8 | 4 |
| 10 | 3 |

EXAMPLE 20

(a) A textile fabric containing a mixture of Dacron polyester and cotton (65/35) is treated with the composition prepared in Example 1(c) by dipping the fabric in aqueous dispersions containing 0.7 percent by weight of the silicone polymer and 1.7 percent by weight of dimethyol dihydroxy ethylene urea in which the percent by weight is based on the total weight of the solution. The fabric is then dried for 2 minutes at 70° C. in a forced air oven. A soft, silky hand is obtained which would correspond to a hand characteristic rating of 4.

(b) As a comparison, a textile fabric of polyester and cotton (65/35) is treated in accordance with (a) above with an aqueous solution containing 1.7 percent by weight of dimethyol dihydroxy ethylene urea. A harsh, stiff hand is obtained which would correspond to a hand characteristic rating of 2.

EXAMPLE 21

(a) About 258.6 parts of a carboxylic acid functional polyether prepared in accordance with Example 1(a) are mixed with 29.8 parts of chloropropyltrimethoxysilane, 15.2 parts of triethylamine and 100 parts of toluene and refluxed for nine hours. A yellow liquid product containing a white solid precipitate is formed. The product is filtered and the white solid precipitate is identified as triethylamine hydrochloride. The liquid product is vacuum stripped (1 torr) up to about 150° C.

A silylated polyether having a viscosity of about 30,000 cs. at 25° C. is obtained.

(b) About 90 parts of the silylated polyether prepared in (a) above are mixed at 25° C. with 10 parts of a linear silanol terminated dimethylpolysiloxane having a silanol content of about 2.5 percent and a viscosity of about 70 cs. at 25° C. for three hours. The resultant product is an opaque, yellow liquid having a viscosity of about 22,000 cs. at 25° C.

A portion of the product is dispersed in water and an emulsion is formed which is stable after 3 months. When the water is evaporated, a rubber-like film is formed.

EXAMPLE 22

Fabrics, including polyester, cotton, wool, nylon and rayon are treated with the compositions of Examples 1 and 21 in accordance with the procedure described in Example 19. The treated fabrics have a soft, silky, lubricuous hand.

What is claimed is:

1. A composition for treating textile materials comprising a silanol terminated organopolysiloxane and a silylated polyether of the general formula $$\begin{array}{c} CH_2(OC_nH_{2n})_xR_fA_b \\ | \\ [\ CH(OC_nH_{2n})_xR_fA_c\ ]_a \\ | \\ CH_2(OC_nH_{2n})_xR_fA_d \end{array}$$

in which at least one R is selected from the group consisting of an —NH radical, an ammonium radical and a radical selected from the group consisting of

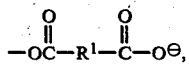

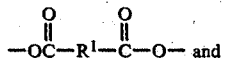

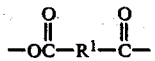

wherein the radicals are linked to the polyether through a group selected from the class consisting of an ester, amine, amide and ammonium radicals and the remaining R's are selected from the group consisting of hydroxyl, hydrocarbonoxy radicals having up to 18 carbon atoms and a radical of the formula

$R^1$ is a divalent hydrocarbon radical selected from the group consisting of $(-CH_2)_p$, $-CH=CH-$ and a cyclic radical selected from the group consisting of $C_6H_4$, $C_6H_8$, $C_6H_{10}$ and $C_{10}H_6$; A is a silicon containing radical selected from the group consisting of cationic and anionic radicals of the formula

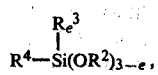

-continued

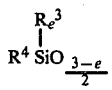

and nonionic radicals of the formula

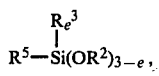

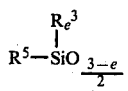

in which $R^2$ and $R^3$ are monovalent hydrocarbon radicals having from 1 to 18 carbon atoms, $R^4$ is an ionic radical linked to a silicon atom consisting of carbon, hydrogen, oxygen and nitrogen atoms which is selected from the group consisting of

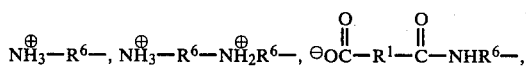

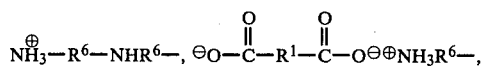

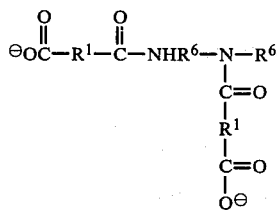

$R^5$ is a nonionic divalent radical selected from the group consisting of $R^6$ and a radical consisting of carbon, hydrogen, oxygen and nitrogen atoms which is selected from the group consisting of

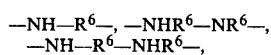

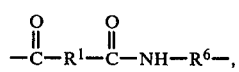

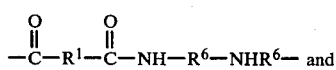

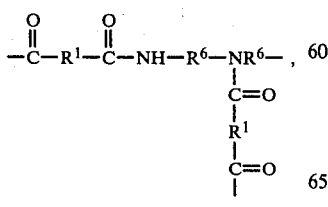

with the proviso that when R is the radical

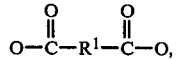

then $R^5$ is $R^6$, wherein $R^6$ is a radical selected from the group consisting of a saturated divalent hydrocarbon radical having up to 10 carbon atoms, a divalent hydrocarbonoxy radical having up to 50 carbon atoms in which the oxygen is in the form of an ether linkage and an unsaturated divalent hydrocarbon radical having up to 10 carbon atoms in which the unsatisfied valences of the $R^6$ radical are linked to a silicon atom and the unsatisfied valences of A are satisfied by R and when A is a divalent radical, the ratio of A to R is 1:2 and when R is cationic, then A must be anionic and when R is anionic, then A must be cationic and when R is nonionic, then A must be nonionic, a is a number of from 0 to 4, b, c and d are each numbers of from 0 to 1 and the sum of b, c and d must be at least 1 and when b, c or d are 0, then R is selected from the group consisting of a hydroxyl, a hydrocarbonoxy radical and a radical of the formula

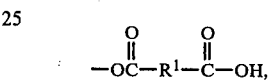

e is a number of from 0 to 2, f is 0 or 1 and when f is 0, then $R^5$ is a divalent hydrocarbonoxy radical linked to the silicon atom through a carbon-carbon bond, n is 2, 3 or 4, x is a number of at least 1 and up to 600 and y is a number of from 0 to 10.

2. The composition of claim 1, wherein A is a radical of the formula

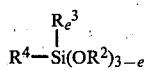

in which $R^2$ and $R^3$ are each monovalent hydrocarbon radicals having from 1 to 18 carbon atoms, $R^4$ is an ionic radical linked to a silicon atom consisting of carbon, hydrogen, oxygen and nitrogen atmos which is selected from

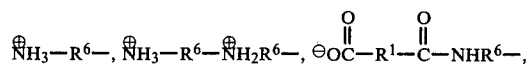

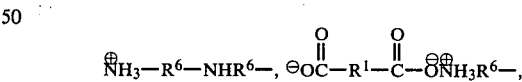

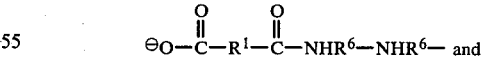

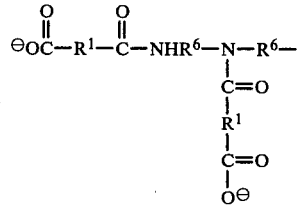

and e is a number of from 0 to 2.

3. The composition of claim 1, wherein A is a radical of the formula

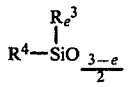

in which $R^3$ is a monovalent hydrocarbon radical having from 1 to 18 carbon atoms, $R^4$ is an ionic radical linked to a silicon atom consisting of carbon, hydrogen, oxygen and nitrogen atoms which is selected from

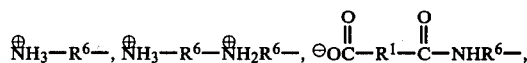

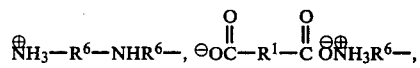

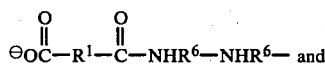

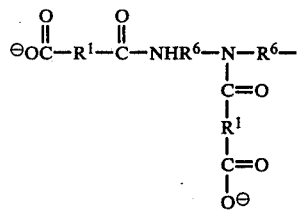

and e is a number of from 0 to 2.

4. The composition of claim 1, wherein A is a nonionic silicon containing radical of the formula

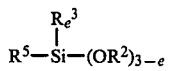

in which $R^2$ and $R^3$ are each monovalent hydrocarbon radicals having from 1 to 18 carbon atoms, $R^5$ is a nonionic divalent radical selected from the group consisting of $R^6$ and a radical consisting of carbon, hydrogen, oxygen and nitrogen atoms which is selected from the group consisting of

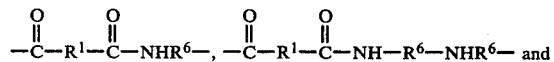

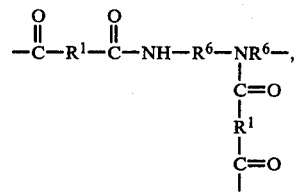

with the proviso that when R is the radical

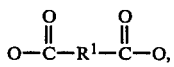

then $R^5$ is $R^6$, wherein $R^6$ is a radical selected from the group consisting of a saturated divalent hydrocarbon radical having up to 10 carbon atoms, a divalent hydrocarbonoxy radical having up to 50 carbon atoms in which the oxygen is in the form of an ether linkage and an unsaturated divalent hydrocarbon radical having up to 10 carbon atoms and e is a number of from 0 to 2.

5. The composition of claim 1, wherein A is a radical of the formula

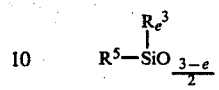

in which $R^3$ is a monovalent hydrocarbon radical having from 1 to 18 carbon atoms, $R^5$ is a nonionic divalent radical selected from the group consisting of $R^6$ and a radical consisting of carbon, hydrogen, oxygen and nitrogen atoms which is selected from the group consisting of

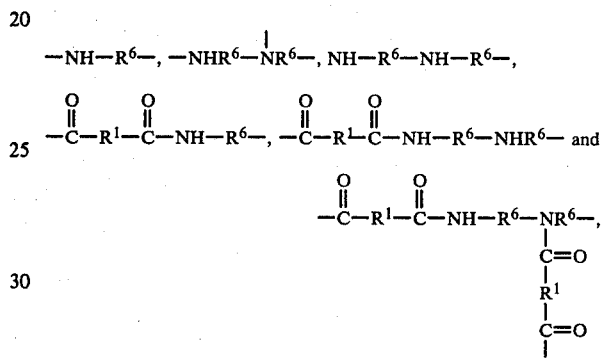

with the proviso that when R is the radical

then $R^5$ is $R^6$, wherein $R^6$ is a radical selected from the group consisting of a saturated divalent hydrocarbon radical having up to 10 carbon atoms, a divalent hydrocarbonoxy radical having up to 50 carbon atoms in which the oxygen is in the form of an ether linkage and an unsaturated divalent hydrocarbon radical having up to 10 carbon atoms and e is a number of from 0 to 2.

6. The composition of claim 1, wherein R is an ammonium ion and A is a group of the formula

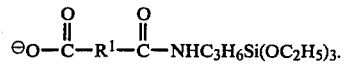

7. The composition of claim 1, wherein R is an ammonium ion and A is a group of the formula

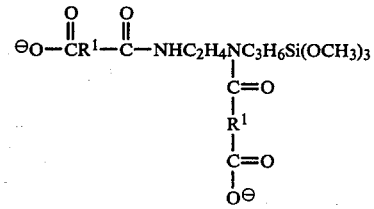

8. The composition of claim 1, wherein the silanol terminated organopolysiloxane is present in an amount of from 0.25 to 99.75 percent by weight and the silylated polyether is present in an amount of from 99.75 to 0.25 percent by weight based on the weight of the silanol terminated organopolysiloxane and the silylated polyether.

9. The composition of claim 1, wherein the silanol terminated organopolysiloxane is a silanol terminated diorganopolysiloxane having a viscosity of from 15 to 1,000,000 cs. at 25° C.

10. A process for preparing a composition for treating textile materials which comprises reacting a silanol terminated organopolysiloxane with a silylated polyether having the general formula $$\begin{array}{c} CH_2(OC_nH_{2n})_xR_fA_b \\ | \\ [\,CH(OC_nH_{2n})_xR_fA_c\,]_a \\ | \\ CH_2(OC_nH_{2n})_xR_fA_d \end{array}$$

in which at least one R is selected from the group consisting of an —NH radical, an ammonium radical and a radical selected from the group consisting of

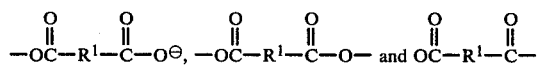

wherein the radicals are linked to the polyether through a group selected from the class consisting of an ester, amine, amide and ammonium radicals and the remaining R's are selected from the group consisting of hydroxyl, hydrocarbonoxy radicals having up to 18 carbon atoms and a radical of the formula

$R^1$ is a divalent hydrocarbon radical selected from the group consisting of $(-CH_2)_y$, $-CH=CH-$ and a cyclic radical selected from the group consisting of $C_6H_4$, $C_6H_8$, $C_6H_{10}$ and $C_{10}H_6$; A is a silicon containing radical selected from the group consisting of cationic and anionic radicals of the formula

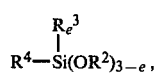

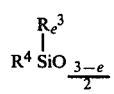

and nonionic radicals of the formula

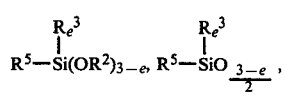

in which $R^2$ and $R^3$ are monovalent hydrocarbon radicals having from 1 to 18 carbon atoms, $R^4$ is an ionic radical linked to a silicon atom consisting of carbon, hydrogen, oxygen and nitrogen atoms which is selected from the group consisting of

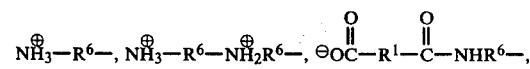

-continued

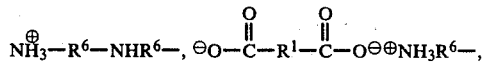

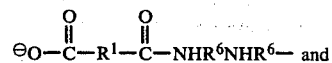

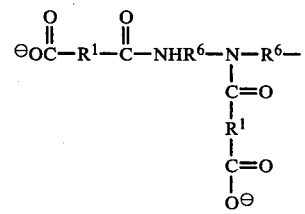

$R^5$ is a nonionic radical consisting of $R^6$ and a radical consisting of carbon, hydrogen, oxygen and nitrogen atoms which is selected from the group consisting of

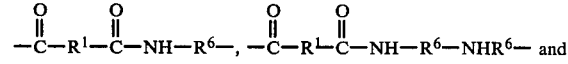

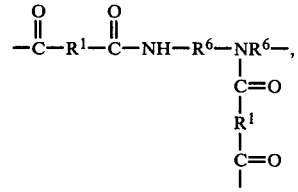

with the proviso that when R is the radical

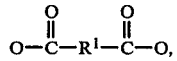

then $R^5$ is $R^6$, wherein $R^6$ is a radical selected from the group consisting of a saturated divalent hydrocarbon radical having up to 10 carbon atoms, a divalent hydrocarbonoxy radical having up to 50 carbon atoms in which the oxygen is in the form of an ether linkage and an unsaturated divalent hydrocarbon radical having up to 10 carbon atoms in which the unsatisfied valences of the $R^6$ radical are linked to a silicon atom and the unsatisfied valences of A are satisfied by R and when A is a divalent radical, the ratio of A to R is 1:2 and when R is cationic, then A must be anionic and when R is anionic, then A must be cationic and when R is nonionic, then A must be nonionic, a is a number of from 0 to 4, b, c and d are each numbers of from 0 to 1 and the sum of b, c and d must be at least 1 and when b, c or d are 0, then R is selected from the group consisting of a hydroxyl, a hydrocarbonoxy radical and a radical of the formula

e is a number of from 0 to 2, f is 0 or 1 and when f is 0, then $R^5$ is a divalent hydrocarbonoxy radical linked to the silicon atom through a carbon-carbon bond, n is 2, 3 or 4, x is a number of at least 1 and up to 600 and y is a number of from 0 to 10.

11. The process of claim 10, wherein the silanol terminated organopolysiloxane and the silylated polyether are heated to an elevated temperature.

12. The composition obtained from the process of claim 11.

13. A process for treating a textile material which comprises coating a textile material with the composition of claim 1 and thereafter curing the coated material at an elevated temperature.

14. The process of claim 13, wherein the composition of claim 1 is dissolved in a diluent prior to coating the textile material.

15. The process of claim 14, wherein the composition of claim 1 is dissolved in a diluent to form a solution containing from 0.25 to 99.75 percent by weight of the composition based on the weight of the composition and diluent.

16. The process of claim 14, wherein the diluent is water.

17. The process of claim 13, wherein the textile material is coated with the composition of claim 12.

18. The process of claim 17, wherein the composition of claim 12 is dissolved in a diluent prior to coating the textile material.

19. The process of claim 13, wherein the textile material is a polyester.

20. The process of claim 17, wherein the textile material is a polyester.

21. The coated textile material of claim 13.

22. The coated textile material of claim 17.

23. The coated textile material of claim 19.

24. The coated textile material of claim 20.

* * * * *